July 24, 1962
W. S. NICHOLS
3,046,035
HAND TRUCK
Filed Dec. 14, 1960
2 Sheets-Sheet 1
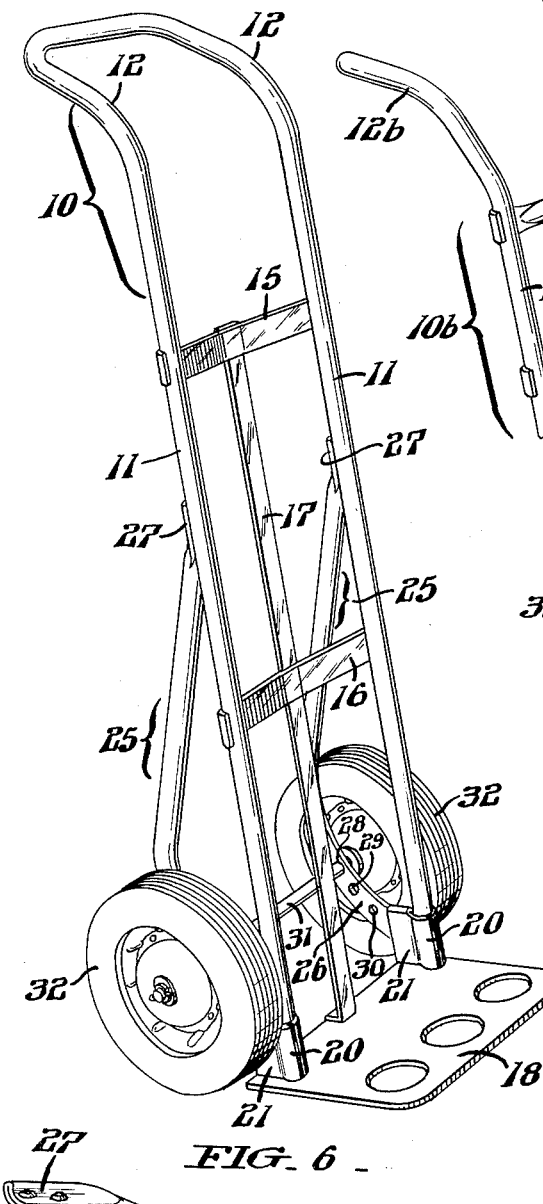
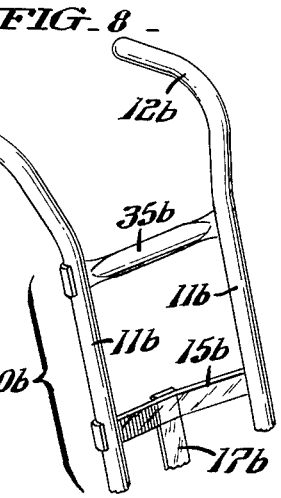
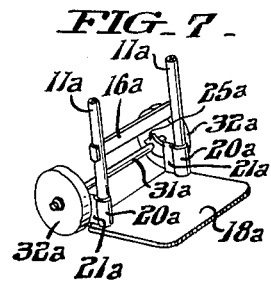
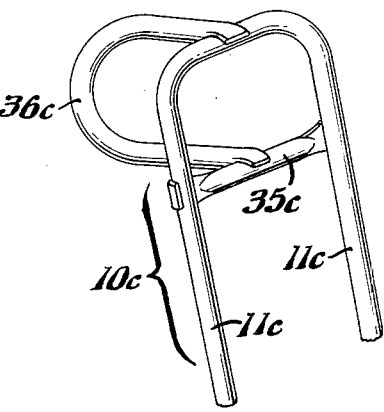
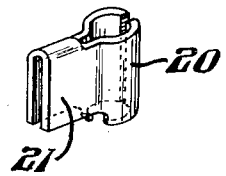
INVENTOR.
Walter S. Nichols,
BY
Paul & Paul
ATTORNEYS.

July 24, 1962 W. S. NICHOLS 3,046,035
HAND TRUCK
Filed Dec. 14, 1960 2 Sheets-Sheet 2
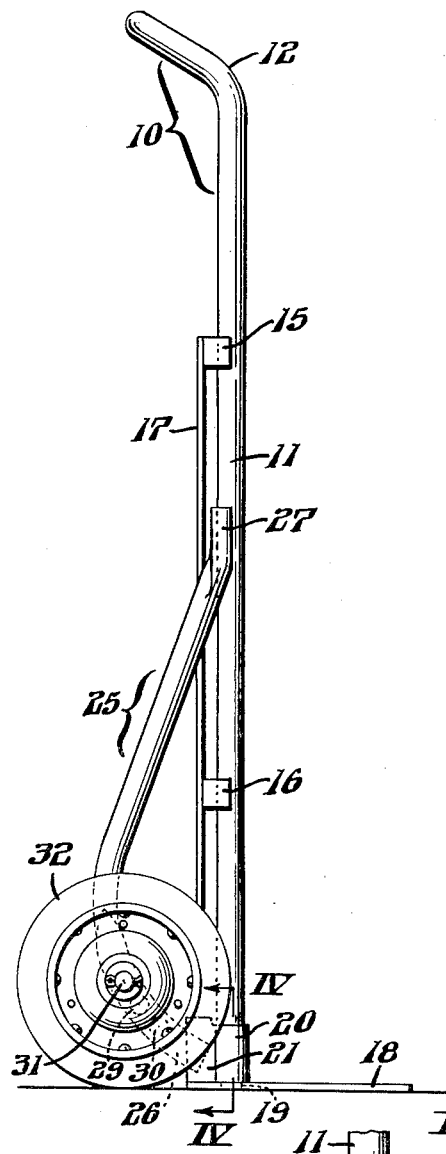
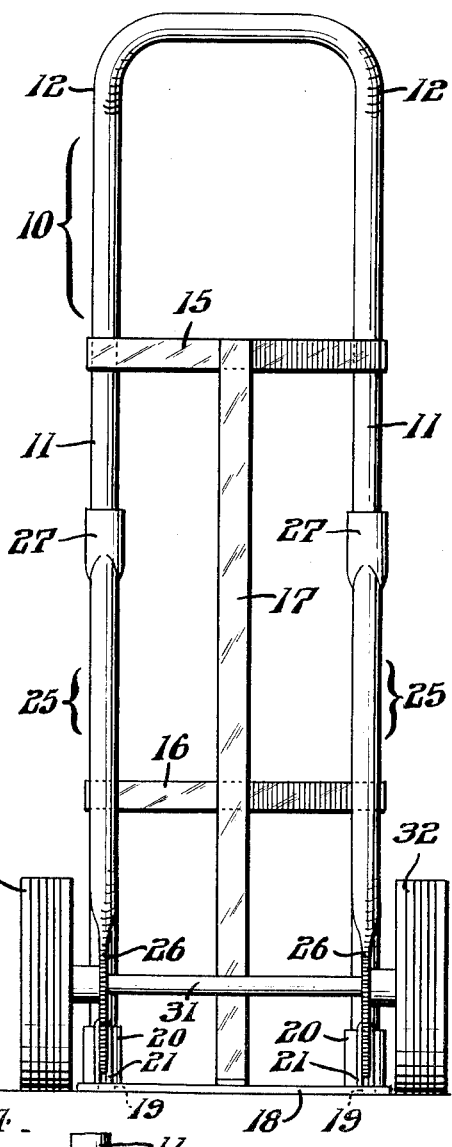
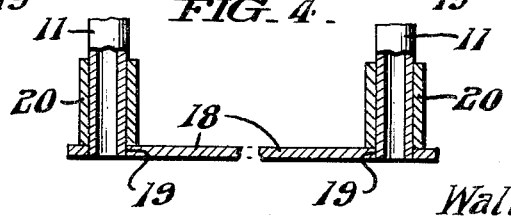
INVENTOR.
Walter S. Nichols,
BY
Paul & Paul
ATTORNEYS.

:::{.center}
3,046,035
HAND TRUCK
Walter S. Nichols, Philadelphia, Pa., assignor to Universal American Corporation, New York, N.Y., a corporation of Delaware
Filed Dec. 14, 1960, Ser. No. 75,810
7 Claims. (Cl. 280—47.27)
:::

This invention relates to a hand truck useful in moving small packages, barrels, shipping cases, boxes, cartons and the like.

The chief aim of my invention is to provide a hand truck, suitable for the above purposes, which is simple in construction; of which the frame parts are all fashioned from metallic stock materials; which, nevertheless is light in weight and rugged to withstand rough usage; and which, withal, lends itself to ready economic production in quantity both from the standpoints of material and labor costs.

Other objects and attendant advantages will appear from the following detailed description of the attached drawings wherein:

FIG. 1 is a perspective view of a hand truck conveniently embodying my invention in one form;

FIGS. 2 and 3 respectively show the truck of FIG. 1 in side and rear elevation;

FIG. 4 is a detail sectional view taken as indicated by the angled arrows IV—IV in FIG. 2;

FIG. 5 is a perspective view of one of the frame components of the truck;

FIG. 6 is a perspective view of another of the frame components; and

FIGS. 7, 8 and 9 are fragmentary views in perspective of various modifications.

With more specific reference, first to FIGS. 1–3 of these illustrations, the truck in the form thereshown comprises a main frame component 10 which is fashioned to elongate U-shaped configuration from a length of light weight metallic tubing of steel for example, and which provides the side members 11, the upper portion of said component being curved rearwardly, as at 12, for convenience of hand grasping. At spaced intervals vertically, the component 10 is strengthened in this instance by flat cross bars 15 and 16 which extend between and have their ends connected to the side members 11, and by a strap 17 centrally disposed between said side members and connected to said cross bars. A substantially rectangular nose piece 18 struck from suitably stiff plate steel, is provided in its lower corners with holes 19 (FIG. 4) for penetration by the ends of the side members 11 of the main component 10. Foot mountings in the form of collars 20 are secured about the side members 11 of the main frame component and backed up against the nose piece 18 and are provided with radial ear lugs 21. As best seen in FIG. 5 each of these foot mountings 20 is fashioned from a blank of sheet metal, the collar portion being longitudinally split at the front, and the ear lug 21 being clevised. The frame of the truck further comprises a pair of elements in the form of skid bars 25 which, substantially, are arcuate in confiuration formed from metallic tubing and flattened at one end as at 26 and concavely flattened as at 27 at the other end, the end portions 26 being provided with a plurality of spaced apertures 28, 29 and 30. As shown, the flattened ends 26 of the skid bars 25 are engaged into the clevised ear lugs 21 of the foot mountings 20 and the other or flat rounded ends 27 of said bars are secured to the side members of the main frame component. It is to be understood that in practice the above described parts are all integrated by welding at the regions of mutual contact.

Selectively engageable through corresponding holes 28, 29 and 30 in the skid bars 25 is an axle 31, and mounted on the protruding ends of said axle are supporting wheels 32 which, in this instance, are fitted with interchangeable semi-pneumatic rubber tires.

In the modification of FIG. 7, short, single-apertured spurs 25a secured within the clevised ear lugs 21a of the foot mountings 20 serve for the axle 31a of the wheels 32a which may be of metal only. This alternative construction is suitable more especially to hand trucks of smaller sizes and, otherwise may be like that of FIG. 1 except for omission of the center strip 17 of the latter construction.

In the modification illustrated in FIG. 8, the side members 11b are provided by individual lengths of tubing with their upper end portions rearwardly curved as at 12b for service as individual hand grasps. An additional cross bar 35b disposed at a distance above the cross bar 15b is here provided for the purpose of greater rigidity, said bar 35b being fashioned from tubing with its opposite ends round-flattened and secured to the side members of the main frame component 10b.

In the modification of FIG. 9, the frame component 10c is U-shaped as in FIGS. 1 and 2 but the upper end portion thereof is not rearwardly bent. In this instance a grasp handle 36c is provided by a rearwardly extending member fashioned to U-shaped configuration with the ends thereof round-flattened, one end being secured to the cross member of component 10c at the center and the other end being secured to the cross bar 35c at the center. As in FIG. 8, the cross bar 35c here is formed from tubing with its ends round-flattened and secured respectively to the side members 11c of the main frame component 10c.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appened claims, and that in some cases certain features of my invention may be used to advantage without a corresponding use of other features.

Having thus described my invention, I claim:

1. As a new product of manufacture, a hand truck having a frame with substantially parallel elongate tubular metallic side members and with hand grasp means at its upper end; a substantially rectangular metallic nose plate apertured at its rear corners for penetration by the bottom ends of the side members and there secured to the latter; foot mountings each fashioned in one piece from stiff plate metal with a collar portion embracing one of the side members of the frame directly above the nose plate and secured to the latter and with a pair of rearwardly-projecting spaced wing lugs; arcuate skid bars formed of metallic tubing each having one end portion flattened and engaged between the spaced wing lugs of one of the foot mountings, and the other end portion thereof concavely flattened to conform with the corresponding side member of the frame and secured to it at the back; an axle passed through aligned apertures in the first mentioned flattened end portions of the skid bars rearwardly beyond the spaced wing lugs of the respective foot mountings; and wheels mounted on the opposite ends of said axle.

2. A hand truck characterized as in claim 1, wherein the frame parts are integrated by welding at the regions of mutual contact.

3. A hand truck characterized as in claim 1, wherein the upper portions of the side members of the frame are rearwardly bent for hand grasping.

4. A hand truck according to claim 1, wherein the flattened end portions of the skid bars are provided with plural correspondingly spaced apertures for selective passage therethrough of the wheel axle.

5. A hand truck characterized as in claim 1, wherein the side members of the frame are connected at spaced intervals by several cross members; and wherein a reinforcing bar medially disposed between the side members is secured to said cross members and to the nose plate.

6. A hand truck characterized as in claim 1, wherein the frame is fashioned to inverted U configuration from a length of metallic tubing.

7. A hand truck characterized as in claim 6, further including a tubular cross bar connecting the side members of the inverted U frame somewhat below the bight portion of the inverted U frame, said cross bar having the ends thereof concavely flattened to embrace the side members of said inverted U frame, and wherein a rearwardly extending U shaped grasp member, likewise fashioned from a length of metallic tubing, has its opposite ends concavely flattened to embrace the bight portion of the inverted U frame and the cross bar at the centers respectively of said bight portion and said cross bar.

References Cited in the file of this patent

UNITED STATES PATENTS

| | | |
|---|---|---|
| 319,524 | Steel | June 9, 1885 |
| 948,964 | Buckley | Feb. 8, 1910 |
| 1,192,790 | Knapp | July 25, 1916 |
| 1,341,171 | Hall | May 25, 1920 |
| 2,510,676 | Biek | June 6, 1950 |
| 2,564,248 | Chenette | Aug. 14, 1951 |
| 2,710,195 | Kurth | June 7, 1955 |
| 2,843,393 | Dahlander | July 15, 1958 |